Figure 1:
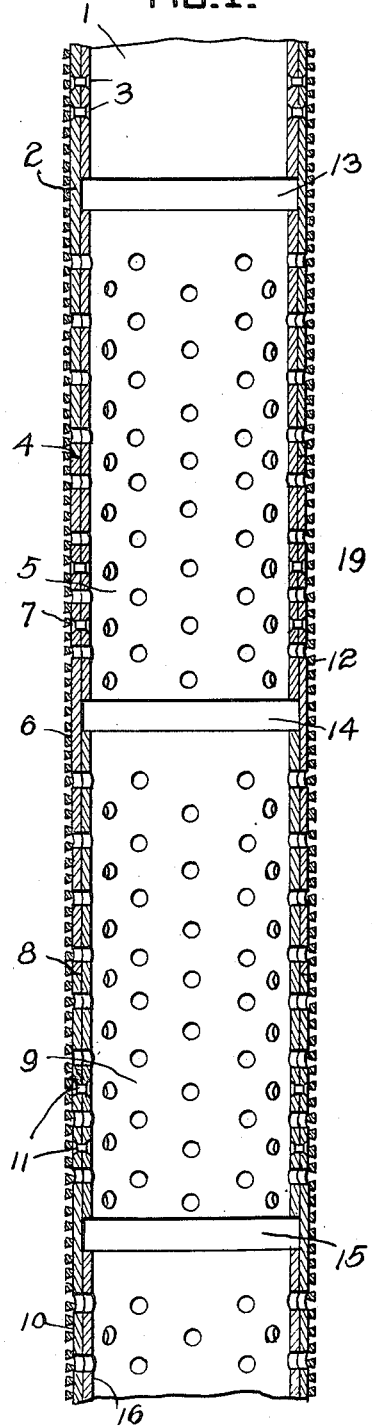

July 1, 1924.

M. E. LAYNE

WELL SCREEN 1,499,382

Filed Sept. 8, 1920    2 Sheets—Sheet 1

INVENTOR
M. E. Layne
by
James C. Bradley

July 1, 1924. 1,499,382
M. E. LAYNE
WELL SCREEN
Filed Sept. 8, 1920 2 Sheets-Sheet 2
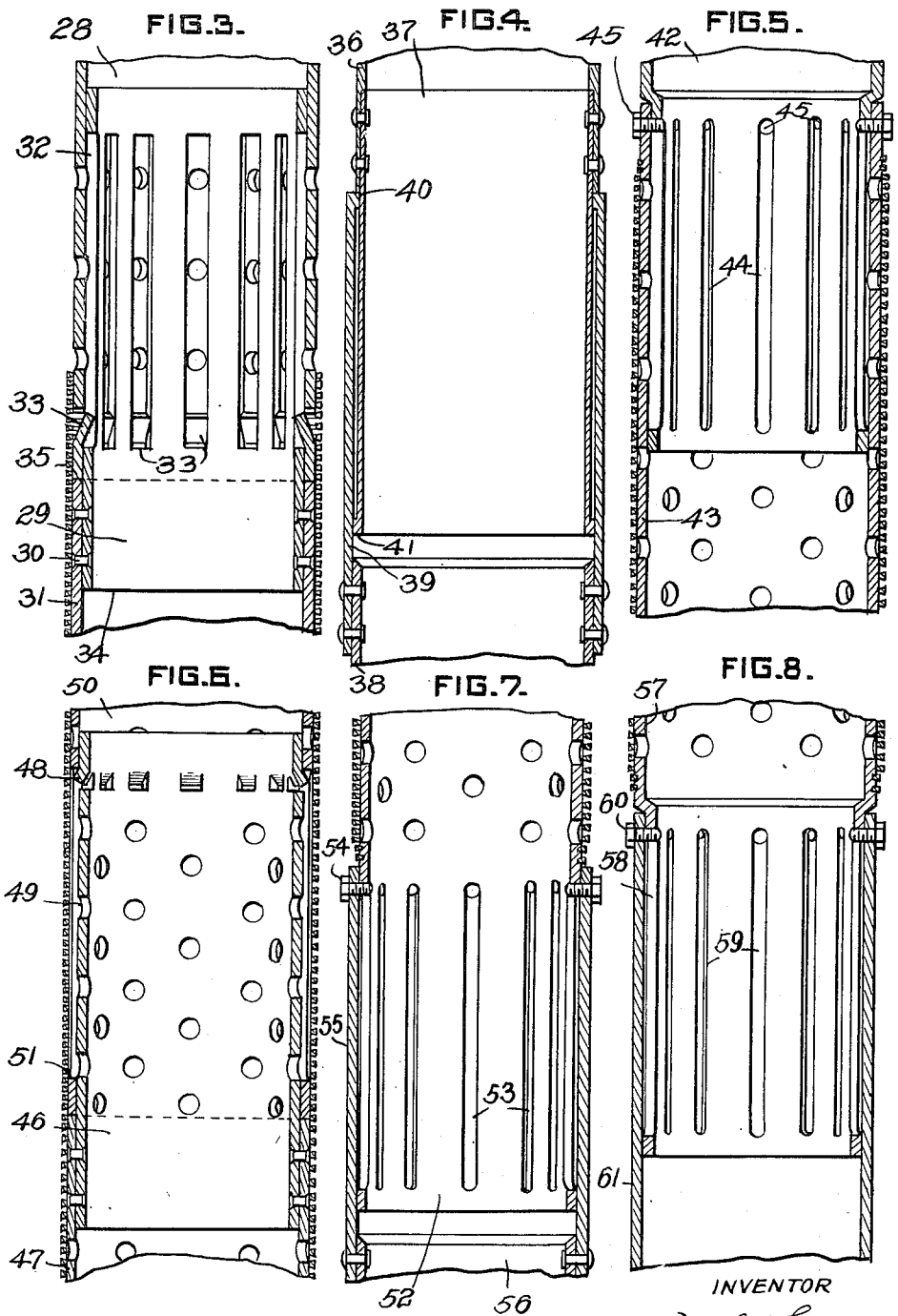

Patented July 1, 1924.

1,499,382

UNITED STATES PATENT OFFICE.

MAHLON E. LAYNE, OF LOS ANGELES, CALIFORNIA.

WELL SCREEN.

Application filed September 8, 1920. Serial No. 408,945.

*To all whom it may concern:*

Be it known that I, MAHLON E. LAYNE, a citizen of the United States, residing at Los Angeles, in the county of Los Angeles and State of California, have invented certain new and useful Improvements in Well Screens, of which the following is a specification.

The invention relates to well screen for use in oil or water wells and has for its principal object the provision of an improved screen which may be more easily removed from the wells for replacement or repair or for any other purpose after the screen has been in place a considerable time. After the ordinary screen has been in use for some time it becomes, in many cases, practically fixed and impossible of removal, so that if the screen becomes choked up or requires removal for any other cause, it is practically impossible to remove it. This condition frequently causes the abandonment of the well resulting in a large financial loss incident to the loss of the well and to the loss of the screen, a part of which might be capable of re-use after the replacement or repair of a part of the construction. It often happens that a well becomes non-productive solely because of the choking up and deterioration of the screen and if this screen could be removed and replaced, the well would be restored to its original condition as to production. The present invention is designed to provide a screen which may be readily removed. Briefly stated this is accomplished by making the screen sectional with slip connections between the sections so that the force employed in pulling the screen is applied successively to the sections, the pulling force available for this purpose being sufficient to start the individual sections although not sufficient ordinarily to start the casing as a whole.

In some cases the slip connections between the ends of the sections are such that the sections may be pulled entirely apart while in other cases stop means are provided so that after the sections have moved apart a certain distance their further movement is stopped. In the latter case the movement for the limited distance of each section successively will sufficiently loosen the entire casing so that it may be easily removed. In the first case in which the sections may be pulled entirely apart, each section may be taken completely out if desired starting with the top section, but preferably each section will be merely started with respect to the next lower section and after all of the sections have been loosened, the bottom section will be engaged and the casing as an entirety removed.

Certain embodiments of the invention are illustrated in the accompanying drawings wherein—

Figure 2:
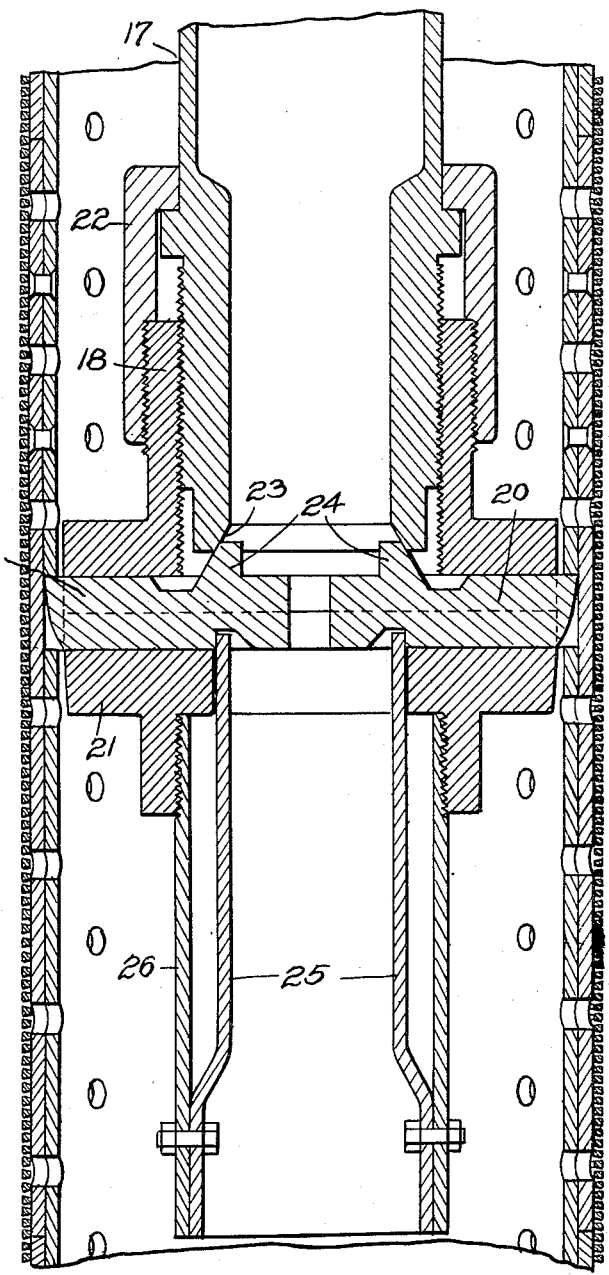

Figure 1 is a vertical section with the type of screen sometimes known as stove-pipe screen and in which no means are provided for preventing the entire separation of the various sections. Fig. 2 is a vertical section through a part of the screen of Fig. 1 upon an enlarged scale and with the tool for removing the screen shown in section. And Figs. 3 to 8 inclusive are sections through modified types of screen all of which have stop means for limiting the movement of the sections at their joints.

Referring to Fig. 1, the numeral 1 indicates the lower end of a screen section, having the section 2 secured to its lower end by the rivets 3, such section terminating at 4; 5 is a second section of screen having the section 6 secured to the lower end thereof by the rivets 7, the section 6 terminating at point 8; and 9 is a third section having the section 10 riveted to the bottom thereof by means of the rivets 11, this arrangement being continued through the length of the screen.

The section 5 telescopes into the section 2 making a tight fit therewith but not so tight as to prevent the parts from being readily pulled apart. Similarly the section 6 fits over the upper end of the section 9 so that the section 6 may be pulled off of the section 9. A screen wire 12 of wedge shape is preferably wound around the screen throughout its length, and the sections of tubing are perforated as illustrated to permit the water to flow into the inside of the tubing.

It will be noted that the sections 1 and 5 are spaced apart at their adjacent ends to provide the space 13 and that similar spaces are provided at 14 and 15 between the opposite ends of the sections 5 and 9 and 9 and 16 respectively. These spaces at the ends of the various sections being provided in order to permit the tool to be inserted to lift the sections successively. Such a tool is shown in engaging position in Fig. 2. This tool comprises a tubular member 17 to which is threaded the upper portion 18 of a guide member for supporting the dogs 19 and 20. 21 is the lower portion of the guide member being bolted to the guide member 18 by means of bolts (not shown). The member 18 is secured to the member 17 by means of the collar 22 and the lower end of the member 17 is beveled as indicated at 23 to engage corresponding beveled lug members 24 on the dogs 19 and 20 so that when the member 17 is screwed down it will cause the retraction of the dogs 19 and 20. The dogs are normally pressed into the position illustrated by means of the leaf springs 25 secured to the tube 26, such tube being screwed into the bottom of the member 21.

When it is desired to remove the screen the tool of Fig. 2 is shoved down into the screen until the dogs 19 and 20 engage the space 13 beneath the first section 1 of Fig. 1. The tool is then moved upwardly which causes the section 2 to slide upwardly over the section 5, such movement being continued only a sufficient distance to loosen the two parts and to loosen the section 1 in the surrounding earth formation. The dogs are then moved down so that they engage the space 14. The section 5 is then pulled upwardly moving the section 6 upward with respect to the section 9. This operation is continued until all the sections are loosened, upward movement on the bottom section being continued to remove the casing as a whole from the well. The tool is released from the casing by rotating the member 17 to cam the dogs back.

It will be seen that the foregoing provides for the easy removal of the casing since the force which is required need only be sufficient to start one section so that the loosening force can be applied in successive increments and the entire screen removed without difficulty regardless of how long it may have been in the well or how tightly it may have become fixed in the surrounding earth or rock. In some cases it may be possible to use the sections over again altho the wire winding will ordinarily be broken and unfit for further use.

Fig. 3 illustrates a modified construction in which stop means for limiting the telescopic movement at the ends of the sections are provided. In this construction the sections 28 and 29 engage telescopically, the section 29 being riveted as indicated at 30 to the section 31. The section 29 is provided with slots 32 adapted to be engaged by pressed in lugs 33 carried by the section 28. These lugs are adapted to engage the upper ends of the slots 32 when the sections are pulled apart, this being accomplished by using a suitable tool for engaging and lifting the section 28. The operation is similar to that heretofore described, the successive sections being loosened, after which the entire screen is removed. The piping may be surrounded by a screen wire 35, or this may be omitted or a different type of screen used, depending upon conditions, which also applies to all the various forms, the invention being directed primarily to the slip connections regardless of the specific type of screen employed.

Fig. 4 illustrates another form of joint which may be employed at the opposing ends of the screen sections. In this construction the section 36 carries the sleeve 37 riveted thereto while the upper end of the next section 38 has riveted to it a sleeve 39 with a flange 40 at its upper end adapted to engage a corresponding flange 41 on the sleeve 37 when the parts are pulled apart to loosen them.

In the construction of Fig. 5 the ends of the screen sections 42 and 43 telescope as illustrated, the section 42 being provided with slots 44 adapted to be engaged by the bolts 45 in the upper end of the section 43, thus limiting the telescopic movement of the sections.

In the construction of Fig. 6, 46 is a sleeve carried by the upper end of the screen section 47 which sleeve is provided with lugs 48 engaging slots 49 in the lower end of the section 50, the screen wire 51 being applied as illustrated, and the lugs being adapted to stop against the ends of the slots 49.

In the construction of Fig. 7 the lower end of the section 52 is slotted as indicated at 53 and such slots are engaged by the bolts 54 carried by the upper end of the sleeve 55, such sleeve 55 being riveted to the upper end of the screen section 56.

In the construction of Fig. 8 the lower end of the screen section 57 is swaged in as indicated at 58 and provided with the slots 59 adapted to be engaged by the screws 60 carried by the upper end of the section 61.

In removing the type of screen having the stop means of Figs. 3 to 8, there is a jarring effect tending to loosen the successive sections when the stops strike the ends of the slots, so that after the first section is started the others are very easily loosened, the inertia of each section at the end of its travel tending to jolt the next section loose.

What I claim is:

1. In combination in a well screen, a plurality of screening sections arranged in series and a series of slip joints between the ends of the succeeding sections to permit each section to be moved upward from its operative position of use in the ground before the upward movement of the next section beneath.

2. In combination in a well screen, a plurality of screening sections arranged in series with a series of telescopic joints at their adjacent ends, and stop means limiting the relative movement of the sections of said joints, the screen being arranged when in position for use so that each section is in its lower position with respect to the section therebeneath and may be moved upward a limited distance without moving such section therebeneath.

3. In combination in a well screen, a plurality of perforated pipe sections with telescopic joints at their adjacent ends, and wire screen wound on the pipe sections.

4. In combination in a well screen, a plurality of perforated pipe sections with telescopic joints at their adjacent ends, stop means limiting the relative movement at said joints, and wire screen wound on the pipe sections.

5. In combination in a well screen, a plurality of perforated pipe sections having telescopic engagement at their ends and arranged so that the telescopic movement of each section inward with respect to the next section is limited.

6. In combination in a well screen, a plurality of perforated pipe sections having telescopic engagement at their ends and arranged so that the telescopic movement of each section inward with respect to the next section is limited, and a wire screening over the sections.

M. E. LAYNE.